United States Patent [19]
Califano

[11] Patent Number: 5,061,069
[45] Date of Patent: Oct. 29, 1991

[54] FIBER-OPTIC BENDER BEAM INTERFEROMETER ACCELEROMETER

[75] Inventor: Herbert T. Califano, Bloomingdale, N.J.

[73] Assignee: Allied-Signal Inc., Morris Township, Morris County, N.J.

[21] Appl. No.: 387,541

[22] Filed: Jul. 31, 1989

[51] Int. Cl.$^5$ .............................................. G01B 9/02
[52] U.S. Cl. ................................... 356/345; 356/361; 250/227.19
[58] Field of Search ............. 356/361, 356, 345, 35.5; 250/227.19, 227.27

[56] References Cited

U.S. PATENT DOCUMENTS 4,191,470  3/1980  Butter ................................ 356/35.5
4,876,447 10/1989  Killian ................................ 356/356

Primary Examiner—Samuel Turner
Attorney, Agent, or Firm—Donald B. Paschburg; Howard G. Massung

[57] ABSTRACT

An inertial measurement instrument including an accelerometer utilizes fiber optics to measure accelerations in two orthogonal axes. Bender beam fiber optic transducers are mounted on a rotating shaft and signals representative of force effects on the bending beams are provided at the rotor in an optical format. The signals are then optically transmitted to the stator thereby eliminating the need for slip rings and the like.

9 Claims, 4 Drawing Sheets

FIBER-OPTIC BENDER BEAM INTERFEROMETER ACCELEROMETER

FIELD OF THE INVENTION

This invention relates to inertial measurement instruments and more particularly to an improved inertial measurement instrument which uses light and interferometry to measure acceleration. This invention further relates to enhancing the acceleration signals via a modulating scheme using rotating masses and to optical coupling of interferometric signals through rotating unions. The invention may be embodied in either a gyroscope or accelerometer or both to form a multisensor.

BACKGROUND OF THE INVENTION

Present multi-axis accelerometer equipment exhibits bias performance of 0.2 milli "g" to 2.0 milli "g". Such equipment which uses piezoelectric bender beam transducers have inherently high electrical impedance and communicate from the rotor to the signal processor via sliprings. The sliprings limit the performance, useful instrument life and reliability, therefore reducing the product use to short time missions such as tactical missiles.

Prior art accelerometers consist of a proof mass with either a mechanical or electrical restoring spring and a means for measuring the deflected angle or the electrical restoring current. A hybrid accelerometer has been developed in which piezoelectric beams are caused to rotate about an axis. An acceleration input causes the beams to deflect, and the deflection is measured through electrical impedance. Changes in impedance are caused by the piezoelectric effect of the bending moments on the beam. It has always been necessary, however, to include the unreliable slip ring contacts for electrical communication.

It is an object of the invention to provide a low cost, compact and accurate system for measuring acceleration. Ideally, such acceleration information must be accurate enough to be used over extended ranges and extended time periods.

SUMMARY OF THE INVENTION

The present invention utilizes bender beam fiber optic transducers attached to a rotor and an optical signal commutation scheme to measure accelerations in two orthogonal axes. The bender beams are mechanically and opto-electrically connected to provide two axes of acceleration information. These features along with small size and low cost make the invention ideally suited for various applications.

The sensor bender beams are interferometers constructed by either integrated optics or discrete element optical components configured with fiber optic cables. The fiber-optic interferometer accelerometer construction uses optical fiber integrally mounted to a bender beam, one leg on the front and one leg on the back in such a manner that one leg extends (lengthens) while the other leg contracts (shortens) by virtue of the beam bending. The integrated optics interferometer accelerometer utilizes a substrate material with the interferometer constructed via optical wave guides imbedded within the front and back faces of the substrate to form the sensor leg and the associated optical couplers. The function of the integrated optics sensor beam is the same as for the fiber-optics version. The interferometers are mounted on a rotating shaft and the interference fringe information is commutated optically. The invention comprises a unique integration of an optically commutated, rotating, interferometer to sense inertial acceleration by the bending of the beam (mass) due to linear accelerations.

No electrical power or electrical signal commutation is required. The commutation is optical and is used to both excite the interferometer and to read the output signals. In this configuration the output signals are optically commutated to the fixed case. The output may be digital or analog depending on the instrument scaling or a combination of digital and analog to provide both fine and course output resolution. Wavelength multiplexing may be utilized to enhance resolution and range.

In one aspect of the invention, an acceleration sensor is constructed in which acceleration is sensed by components which are fixed to a moving rotor assembly. Signals corresponding to inertial forces generated on the rotor components provide optical signal outputs. The optical signals are transmitted from the rotor to a stator assembly and along with shaft position, resolve the two acceleration components.

DETAILED DESCRIPTION OF THE PREFERRED EMBODIMENTS

Figure 1:
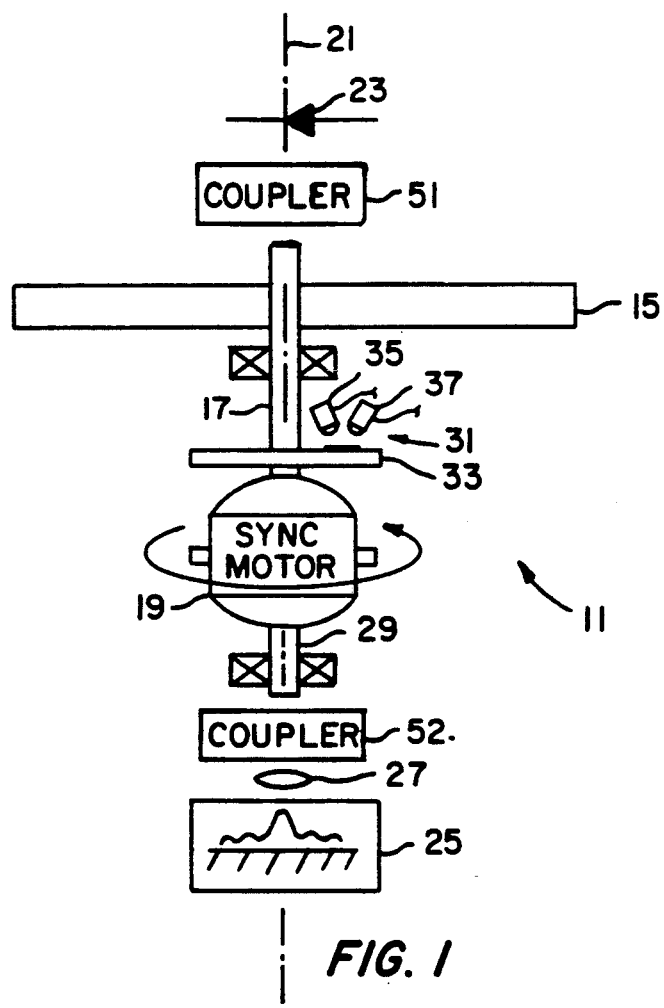
FIG. 1 illustrates a fiber optic interferometer accelerometer constructed in accordance with the present invention.

Turning now to the drawings wherein like reference characters refer to like and corresponding parts throughout the several views, FIG. 1 illustrates a configuration of a fiber optic interferometer accelerometer 11, in which sensor element 15 is mounted to center shaft 17 in a dipole fashion. A synchronous motor 19 causes the shaft 17 and the sensor element 15 to rotate about a center spin axis 21. Light is transmitted from a fiber light source 23 to the center shaft 17 through an optical coupler 51. The shaft 17, thru suitable fiber optics, transmits the light to and from the sensor element 15, through coupler 52 and to an output detection circuit 25. The light source 23 and the output detection circuit 25 are preferably mounted to a frame stationary with respect to shaft 17. Lens 27 may remain stationary or rotate with shaft 17, in accordance with a specific design. Shaft 17 is supported by suitable bearings and is rotated with its associated components including sensor element 15. The coupling of the shaft 17 with the shaft 17 with the light source 23 and output detection circuit 25 is optical. This construction allows signal power to be transmitted to the rotor position 29 of the accelerometer 11, independent of power for the motor 19. Shaft position information is obtained from an optical position encoder 31, an encoder wheel 33 and light transmitters and receivers 35, 37. Suitable rotary position encoders of various types are well known in the art.

Figure 2:
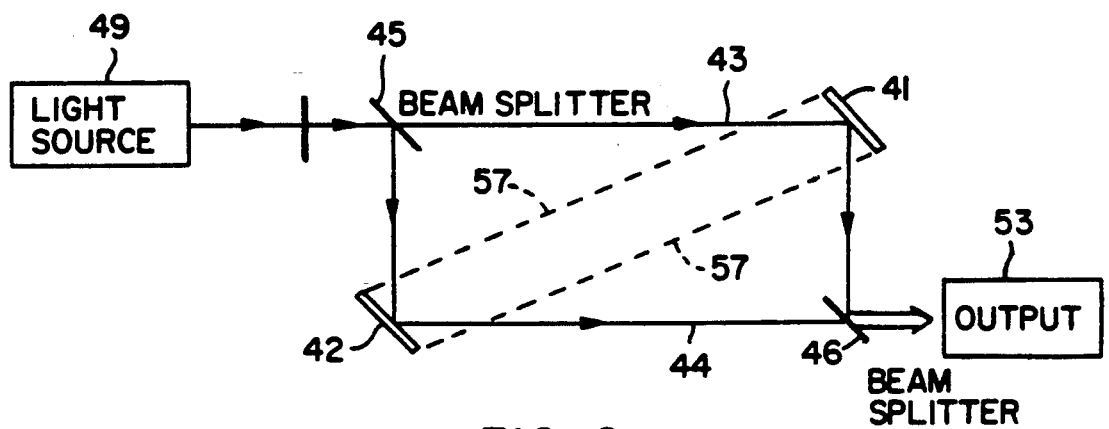
FIG. 2 illustrates the optical configuration of a Mach-Zender interferometer.

Sensor element 15 serves as an acceleration sensor and formed within sensor 15 is a modified Mach-Zender interferometer arrangement which is schematically shown in FIG. 2. The implementation of the claimed invention via a traditional Mach-Zender interferometer includes a pair of mirrors 41, 42 and a pair of beam splitters 45, 46. Light from a source 49 is directed thru one of the beam splitters 45 which causes the light to travel along two different paths 43, 44, to a second beam splitter 46. In the Mach-Zender interferometer, a difference in the spacial index of refraction of the media through which the light passes in each path 43, 44 results in an interferometric phase shift. This phase shift can be detected at the output 53. The Mach-Zender interferometer is modified for the present invention by placing the light paths 43, 44 thru optical fibers which lie along the top and bottom of the thin profiles of sensor element 15. A path length change between path 1, 43 and path 2, 44 will cause interference fringes, M; as seen by the observer at the output 53, to move by the relationship:

M1 = x/λ, where
M = number of fringe shifts
x = path length change
λ = wavelength of the light The construction is such that the mirrors 41, 42 are mechanically coupled, as shown by line 57. Positive displacement on one mirror 41 or 42 will result in negative displacement of the other mirror 42 or 41. This displacement of the mirrors 41, 42 has an effect of further shifting the fringe patterns, as the alignment of the optical path length at beam splitter 46 is shifted. The modified Mach-Zender interferometer provides common mode rejection of temperature, noise, unwanted strain and magnetic fields.

Figure 3:
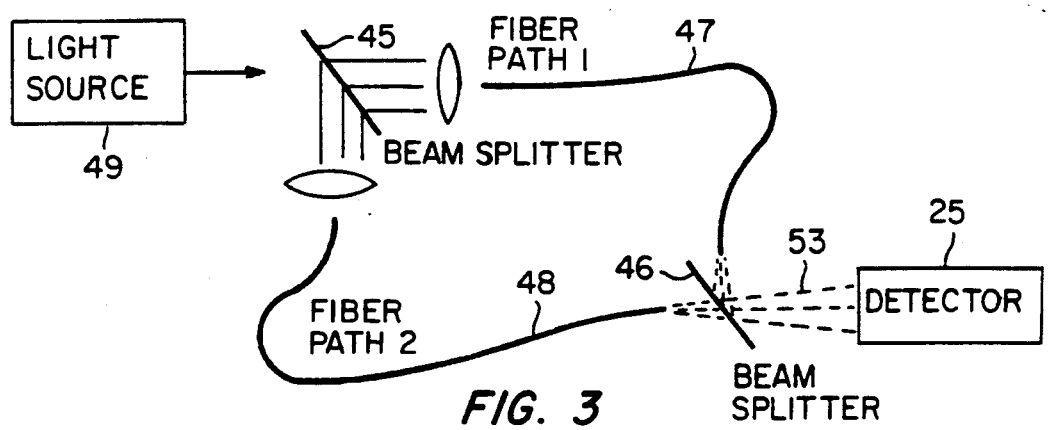
FIG. 3 illustrates the Mach-Zender interferometer implemented by using fiber optics.

FIG. 3 shows the Mach-Zender interferometer implemented by using fiber optics. Light from a bulk optics source 49 is directed thru one of a pair of beam splitters 45 which causes the light to travel along either fiber path 1, 47 or fiber path 2, 48. After traveling through the fiber paths 47, 48 the light flows to the second beam splitter 46 and exists as output 53 and is detected by an output detection circuit 25. The difference in the spacial media through which the light passes in each path 47, 48 results in an interferometric phase shift which is detected at the output 53. Because of the use of fiber paths 1 and 2, 47, 48 no mirrors are required.

Figure 4:
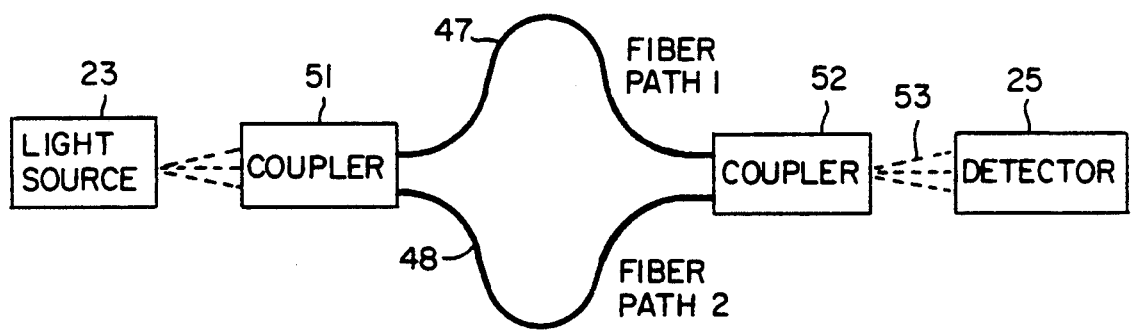
FIG. 4 illustrates the Mach-Zender interferometer implemented by using fiber optics and a pair of couplers.

FIG. 4 illustrates the Mach-Zender interferometer implemented by using fiber optics and a pair of couplers 51, 52 instead of beam splitters 45, 46. Light from a fiber light source 23 flows into the fiber coupler 51 and divides into either fiber path 1, 47 or fiber path 2, 48. After traveling through the fiber paths 47, 48 the light flows to the second coupler 52 to an output 53 and is detected by an output detection circuit 25. Once again, the difference in the spacial media through which the light passes in each path 47, 48 results in an interferometric phase shift which is detected at the output 53. No beam splitters 45, 46 or mirrors 41, 42 are required in this configuration. The fringe shift, M1 due to the path length change is once again:

$$M1 = \frac{\text{change in path length \#1} + \text{change in path length \#2}}{\lambda(\text{wavelength of light})}$$

However, a fringe shift occurs due to a photoelastic effect, Δn, caused by the induced strain in each fiber path 47, 48. Therefore, the total fringe shift is $$M = \frac{n\Delta l + l\Delta n}{\lambda}$$

n = core refractive index
l = path length
λ = wavelength of light

Figure 5:
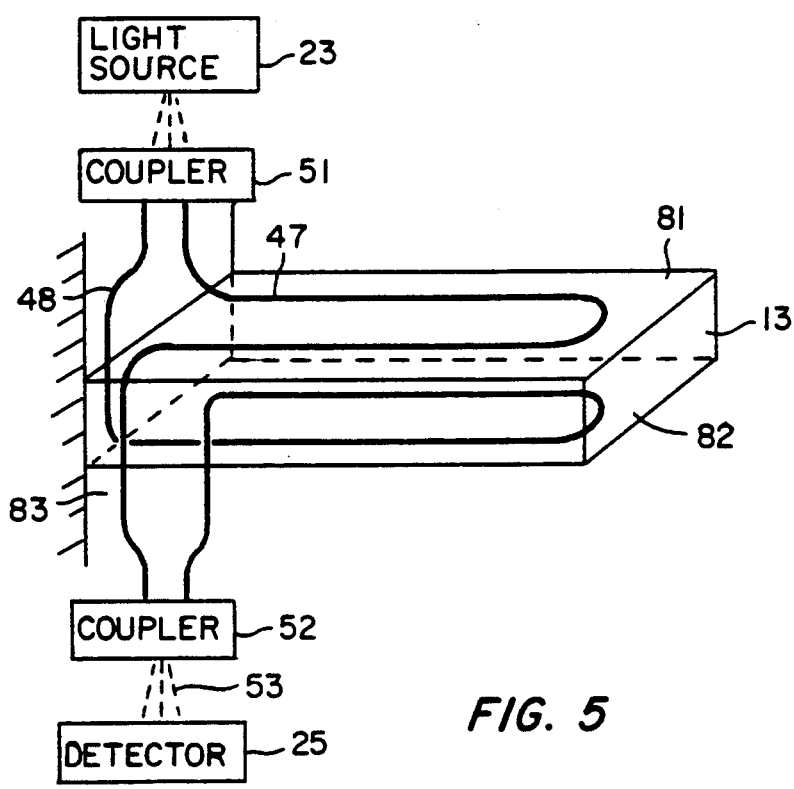
FIG. 5 illustrates a Mach-Zender strain transducer.

FIG. 5 illustrates a Mach-Zender Strain Transducer in which a portion of a sensor element 80 is introduced. The fiber light source 23, the pair of couplers 51, 52, the fiber paths 47, 48, the detector 25 and their relationships are the same as that of FIG. 4. The fiber paths 47, 48, however, travel along the top 81 and bottom 82 surfaces of sensor element 80. This sensor element 80 extends perpendicularly from a strain sensitive axis 83. As strain takes effect, the top surface 81 or the bottom surface 82 of the sensor element 80, lengthens or shortens accordingly. As the surfaces lengthen or shorten, so does their associated fiber paths 47, 48. As an example, if strain forces the sensor element 80, downward, the top surface fiber path 47 elongates and the bottom surface fiber path 48 shortens. This difference in spacial media through which the light passes in each path 47, 48 results in an interferometric phase shift which is detected at the output 53 by an output detection circuit 25. Also, interferometer sensitivity can be enhanced by increasing the number of fiber optic paths or by enhancing the photoelastic effect ωn.

Figure 6:
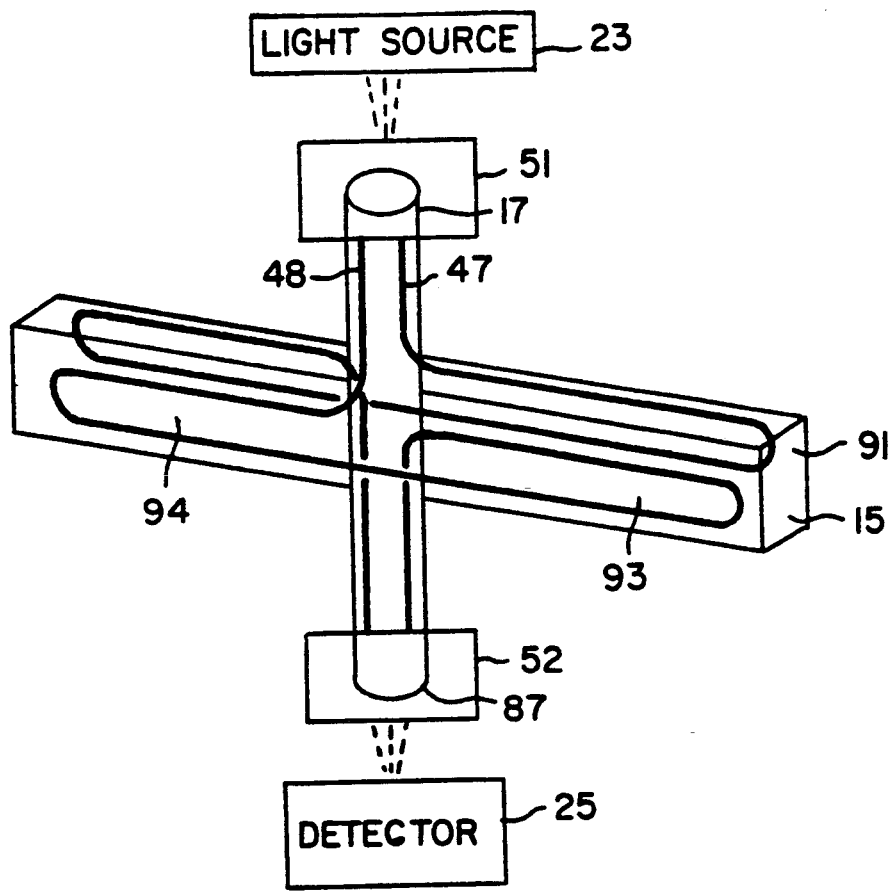
FIG. 6 illustrates the flow of the fiber optic paths on an accelerometer sensor element.

FIG. 6 illustrates the flow of the fiber optic paths 47, 48 through an accelerometer sensor element 15 which is mounted to the center shaft 17 in a dipole fashion. As shown, light from the fiber light source 23 enters through coupler 51 and into fiber path 1, 47 which flows down through the center of the shaft 17 and out along the back surface 91 of the right side 93 of the accelerometer sensor element 15. Fiber path 1, 47, then circles back across the center shaft 17 and out along the back surface 91 of the left side 94 of the accelerometer sensor element 15. Fiber path 1, 47 again circles back and flows through the center shaft 17 to the bottom 87 of the center shaft 17. Fiber path 2, 48 flows down the center of the shaft 17, parallel with fiber path 1, 47, and out along the front surface 92 of the left side 94, the opposite side from fiber path 1, of the sensor element 15. Fiber path 2, 48, then circles back across the center shaft 17 and out along the front surface 92 of the right side 93 of sensor element 15. Fiber path 2, 48 again circles back and flows through the center shaft 17, parallel with the fiber path 1, 47 to the bottom 87 of the center shaft 17. At the bottom 87 of the center shaft 17, the difference in spacial media between fiber path 1, 47 and fiber path 2, 48, results in an interferometric phase shift which is effected by coupler 52 and detected by the output detection circuit 25.

Figure 7:
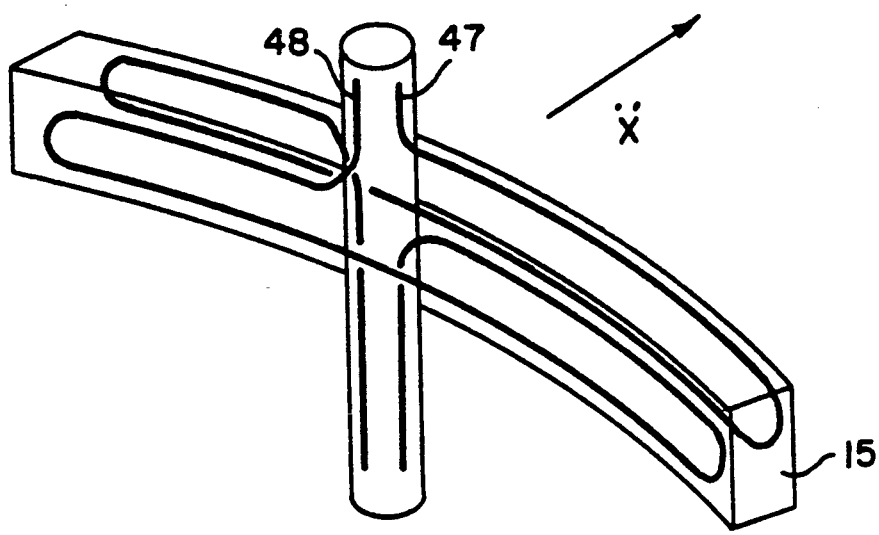
FIG. 7 illustrates a modified Mach-Zender interferometer, under the effect of linear acceleration.

FIG. 7 illustrates the sensor element of the modified Mach-Zender interferometer where the accelerometer sensor element 15 is bending in response to linear acceleration in the direction shown. In this specific example, fiber path 2, 48, shortens and fiber path 1, 47 elongates. This causes a difference in spacial media which results in an interferometric phase shift which is detected. The amplitude of the detected signal is proportional to the amount of linear acceleration applied.

As stated earlier, sensitivity of the interferometer may be enhanced by increasing the optical paths in the sensing element 15. Additional enhancement can be obtained by increasing the photoelastic effect delta of the light path media.

Figure 9:
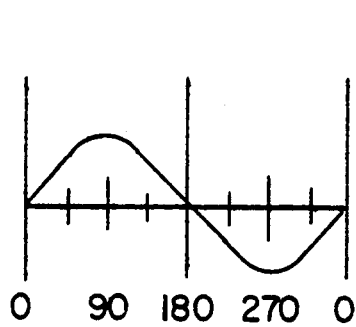
FIG. 8 and 9 illustrate illustrates the phase relationships between the rotor position and accelerometer interferometer.
Figure 8:
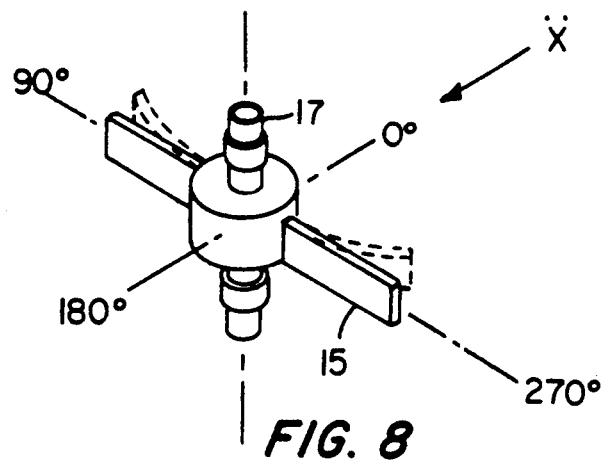

FIGS. 8 and 9 illustrate the effects of deflection upon the accelerometer sensor element 15. The accelerometer sensor elements 15 bend, both sides and in the same direction, in response to the applied acceleration.

The amplitude of the signal output is determined by the applied acceleration, the deflection of the sensor elements, 15 and the angular relationship of the sensor element to the direction of the applied acceleration. The effect on the interferometer sensor as embodied in sensor element 15 is to provide an optical output, interferometric fringes, whose amplitude is proportional to the applied acceleration and varies sinusoidally with the rotor shaft position.

Figure 10:
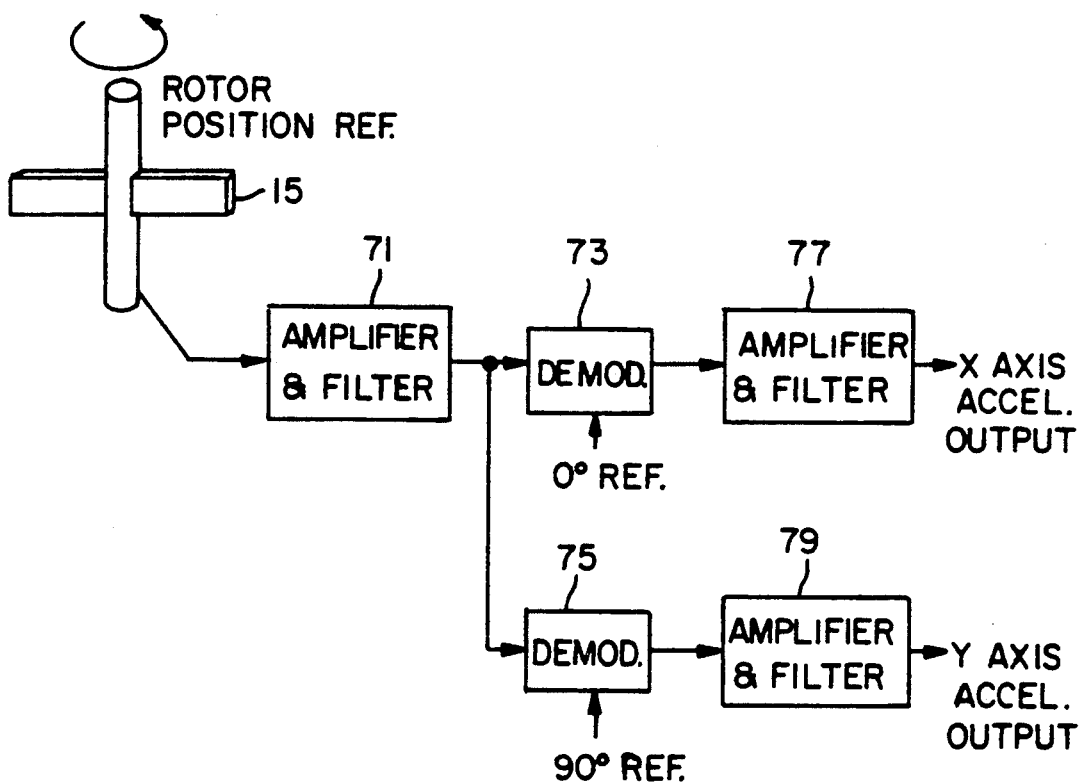
FIG. 10 is a block diagram showing the operation of the present invention.

Referring now to FIG. 10, such fringe measurements can be accomplished along two axis by transmitting the right output from the modified Mach-Zender interferometer in acceleration sensing element 15 to an amplifier and filter 71 which transmits signals in suitable form to demodulators 73, 75. Demodulator 73 provides an output which is correlated to a first rotor position arbitrarily indicated at 0 degrees. A second demodulator 75 provides demodulation information correlated with a second rotor position which is 90 degrees from that of demodulator 73. The signals then flow through amplifiers and filters 77, 79 to provide X and Y axis acceleration outputs.

It is not intended that this invention be limited to the hardware arrangement, or operational procedures shown disclosed. This invention includes all of the alterations and variations thereto as encompassed within the scope of the claims as follows.

I claim:

1. A fiber-optic interferometer accelerometer comprising:
    an acceleration sensor rotatable around a spin axis comprising means for receiving optical energy and for providing an acceleration sensor optical output representative of linear acceleration, wherein said acceleration sensor comprises one or more bender beam fiber optic transducers.

2. A fiber-optic interferometer accelerometer as described in claim 1 further comprising:
    means to transmit optically said acceleration sensor optical output to a receiver which is fixed in rotation, said acceleration sensor optical output being substantially unchanged when transmitted to said receiver.

3. A fiber-optic interferometer accelerometer as described in claim 1 further comprising;
    means to convert said acceleration sensor optical output to an electrical signal.

4. A fiber-optic interferometer accelerometer as described in claim 1 wherein said acceleration sensor senses two axis of acceleration information by sensing bending of one or more bender beam fiber optic transducers due to linear accelerations.

5. A fiber-optic interferometer accelerometer as described in claim 1 wherein said acceleration sensor is mounted to a shaft which rotates around a spin axis.

6. A fiber-optic interferometer accelerometer as described in claim 3 wherein said electrical signal representative of said acceleration sensor optical output is either digital or analog or a combination of digital and analog to provide both fine and course output resolution.

7. A fiber-optic interferometer accelerometer as described in claim 1 wherein said acceleration sensor comprises:
    discrete element optical components configured with fiber optic cable.

8. A method of measuring a linear acceleration component comprising the steps of:
    mounting one or more bendable beams radially on a shaft rotating about a spin axis, said one or more bendable beams having optical fiber, receiving optical energy and providing an acceleration sensor optical output representative of linear acceleration;
    transmitting optically said acceleration sensor optical output to a receiver which is fixed in rotation, said acceleration sensor optical output being substantially unchanged when transmitted to said receiver; and,
    converting said acceleration sensor optical output to an electrical signal.

9. A fiber-optic interferometer accelerometer comprising:
    a housing;
    a plurality of fiber optic acceleration sensing masses supported within said housing for relative rotation therewith;
    means, rotatable with said plurality of fiber optic acceleration sensing masses, for sensing deflection of said plurality of fiber optic acceleration sensing masses, said means for sensing deflection, receiving optical energy and providing an optical output which changes in response to a change in said deflection; and,
    means to communicate said optical output from said means for sensing to a receiver fixed to said housing such that said optical output is substantially unchanged when it is communicated to said receiver.

* * * * *